United States Patent
Garcia Tello et al.

(10) Patent No.: US 6,885,897 B2
(45) Date of Patent: Apr. 26, 2005

(54) MODULE FOR CONTROLLING A DRIVE AND METHOD OF USING THE MODULE

(75) Inventors: Jose Antonio Garcia Tello, Aviles Asturias (ES); Uwe Mertens, Herzogenaurach (DE); Bernd Hessel, Adelsdorf (DE)

(73) Assignee: Framatome ANP GmbH, Erlangen (DE)

(*) Notice: Subject to any disclaimer, the term of this patent is extended or adjusted under 35 U.S.C. 154(b) by 116 days.

(21) Appl. No.: 10/042,478

(22) Filed: Jan. 9, 2002

(65) Prior Publication Data

US 2002/0091453 A1 Jul. 11, 2002

Related U.S. Application Data

(63) Continuation of application No. PCT/DE00/02201, filed on Jul. 5, 2000.

(30) Foreign Application Priority Data

Jul. 9, 1999 (DE) .......................................... 199 32 193

(51) Int. Cl.⁷ .............................................. G05B 11/01
(52) U.S. Cl. ............................. 700/20; 700/21; 700/26; 700/79; 700/80; 700/286; 700/274
(58) Field of Search .............................. 700/20, 21, 26, 700/79, 80, 266, 274

(56) References Cited

U.S. PATENT DOCUMENTS

| | | | |
|---|---|---|---|
| 4,692,299 A | | 9/1987 | Crew et al. |
| 5,287,264 A | * | 2/1994 | Arita et al. .................... 700/79 |
| 5,361,198 A | | 11/1994 | Harmon et al. |
| 5,392,879 A | * | 2/1995 | Boyce et al. ............... 187/393 |
| 5,621,776 A | | 4/1997 | Gaubatz |
| 5,745,539 A | * | 4/1998 | Lang .......................... 376/259 |
| 5,832,049 A | | 11/1998 | Metro et al. |
| 5,914,875 A | * | 6/1999 | Monta et al. ................. 700/79 |
| 6,119,047 A | * | 9/2000 | Eryurek et al. ............... 700/79 |

FOREIGN PATENT DOCUMENTS

| | | |
|---|---|---|
| DE | 29 32 384 | 2/1981 |
| DE | 42 16 699 A1 | 11/1993 |
| EP | 0 987 612 A1 | 12/1998 |
| WO | WO 98/56009 | 12/1998 |

* cited by examiner

Primary Examiner—Anthony Knight
Assistant Examiner—Thomas Pham
(74) Attorney, Agent, or Firm—Laurence A. Greenberg; Werner H. Stemer; Ralph E. Locher

(57) ABSTRACT

A module for controlling a drive is described. The module contains a terminal for connecting to a control system for operating tasks and a control system for safety tasks. Commands from the control system for safety tasks have priority over commands from the control system for operating tasks. A microprocessor is provided for processing the commands and is coupled to the terminal. A logic circuit is provided for prioritizing the commands from the control system for safety tasks, the logic circuit is connected to the microprocessor. At least one output is coupled to the microprocessor and/or the logic circuit. An interface is provided for connecting to the control system for operating tasks or a diagnostic device, the interface is connected to the microprocessor. A memory is provided for storing the commands and replies, the memory is connected to the microprocessor.

11 Claims, 2 Drawing Sheets

MODULE FOR CONTROLLING A DRIVE AND METHOD OF USING THE MODULE

CROSS-REFERENCE TO RELATED APPLICATION

This application is a continuation of copending International Application No. PCT/DE00/02201, filed Jul. 5, 2000, which designated the United States.

BACKGROUND OF THE INVENTION

Field of the Invention

The invention relates to a module for controlling a drive, a control device for an installation, and a method for controlling a drive using such a module.

The present invention relates to a module for controlling a drive, in particular a drive in an installation that can endanger public safety. The drive has two terminals for connecting to a control system for operating tasks and a control system for safety tasks and also has one or more outputs.

Installations that can endanger public safety are understood to be, inter alia, power stations, in particular nuclear power stations. Electrical drives present in these installations are driven both by a control system for operating tasks and by a control system for safety tasks. It must be ensured that the commands of the control system for safety tasks have priority over the commands of the control system for operating tasks. A module is used for this purpose, which module is also referred to as a priority module.

A module of this type is used by the applicant, for example. The known module is relatively large and has a high power loss of almost of 5 watts. In the case of retrofits in installations, the existing space is therefore often the limiting factor. Furthermore, the known module is driven via individual wires and can therefore be integrated into digital control systems only with difficulty.

SUMMARY OF THE INVENTION

It is accordingly an object of the invention to provide a module for controlling a drive and a method of using the module which overcome the above-mentioned disadvantages of the prior art devices and methods of this general type, which has smaller dimensions and a lower power loss than the known module and can also be integrated into digital control systems.

With the foregoing and other objects in view there is provided, in accordance with the invention, a module for controlling a drive. The module contains a terminal for connecting to a control system for operating tasks and a control system for safety tasks. Commands from the control system for safety tasks have priority over commands from the control system for operating tasks. A microprocessor is provided for processing the commands from both the control system for operating tasks and the control system for safety tasks, the microprocessor is coupled to the terminal. A logic circuit is provided for prioritizing the commands from the control system for safety tasks, the logic circuit is connected to the microprocessor. At least one output is coupled to the microprocessor and/or the logic circuit. An interface is provided for connecting to one of the control system for operating tasks and a diagnostic device, the interface is connected to the microprocessor. A memory is provided for storing the commands and replies, the memory is connected to the microprocessor.

In the case of the module of the type mentioned in the introduction, the object is achieved according to the invention by virtue of the fact that the module contains a microprocessor for processing commands, a logic circuit for the priority of the commands from the control system for safety tasks, an interface for connection to the control system for operating tasks or a diagnostic device, and also a memory for storing commands and replies.

The measures according to the invention enable the dimensions and also the power loss to be halved. It is possible, therefore, to accommodate twice as many modules as before on the same space. In this case, the evolution of heat remains unchanged owing to the halved power loss, so that existing auxiliary systems, such as a ventilation system, for example, can be adopted even in the case of retrofits. Furthermore, all the commands and the associated replies can be stored in the memory and be read out and monitored for test purposes. The logic circuit ensures the desired priority of the commands of the control system for safety tasks. On account of the interface, the module according to the invention can be integrated quickly and simply into digital control systems and/or be connected to a diagnostic device.

The microprocessor advantageously contains a timing circuit. The commands and replies can then be logged together with the time of day.

In an advantageous refinement, the logic circuit is provided with a fixed-programmed priority function for commands from the control system for safety tasks. The priority of the commands from the control system for safety tasks is therefore left unaffected by changes in the software, thereby precluding inadvertent erasure of the priority.

In accordance with an advantageous development, the module has at least one electronic protection device protecting against a short circuit of an output. This protects the module from damage and increases the service life.

The module advantageously has coding plugs on a side which is accessible in the installed state. By the coding plugs, the assigned drive can be moved into a position such as open or closed, or on or off, and be kept there. This intervention has topmost priority and is independent of the control systems. The fitting of the coding plugs is reported by each module, so that monitoring by the operating personnel is provided at any time.

The invention furthermore relates to a control device for an installation that can endanger public safety, using a module described above, the module being connected to two manual control stations that are separate from one another. The manual control stations enable manual control of the module by the operating personnel while circumventing the control system for operating tasks. This is necessary in particular for a test of the installation.

Furthermore, a method for controlling a drive using the above module in a control device of this type is described, in which, according to the invention, the state of the drive is indicated in both manual control stations. Therefore, the operating personnel are always informed of the state of the drive.

The software required for operating the module is advantageously read out by a diagnostic device. This enables the software present to be identified.

By use of a separate measurement and test device, it is also possible to introduce new software with a low outlay. A software change is precluded as long as the module is installed in an installation. This precludes risks through software manipulations during operation.

In a first advantageous development, the diagnostic device is connected to a bus connected to the module. The circuit is implemented in modern installations. The diagnostic device then tests the module via the bus and, if appropriate, further interposed systems.

According to a second advantageous refinement, the diagnostic device is connected to the interface of the module. The circuit is used in older installations without a bus.

The interface provided according to the invention allows connection both to a bus and to individual wires in older installations. The software of the module is coordinated with the control systems present in each case and the cabling. The module can therefore be integrated without any problems into the system present in the installation. Use is possible in any control system that can process individual signals or communicate via a bus. The interface is advantageously of redundant configuration, so that redundant systems of the control systems can be used. This allows the use of systems having high availability.

The module according to the invention enables a test of the priority function between operating tasks and safety tasks during current operation by a "boundary scan test". The testing of the control system for safety tasks with respect to the module is effected by short, pulsed triggering of the commands for the drive. At the same time, a test signal is communicated, which prevents a sharp start-up of the drive. The arrival of the commands is confirmed by the module. Therefore, a sharp start-up of the drive is only required for testing the control system for operating tasks. An operationally governed movement of the drive can be incorporated into the test.

Other features which are considered as characteristic for the invention are set forth in the appended claims.

Although the invention is illustrated and described herein as embodied in a module for controlling a drive and a method of using the module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
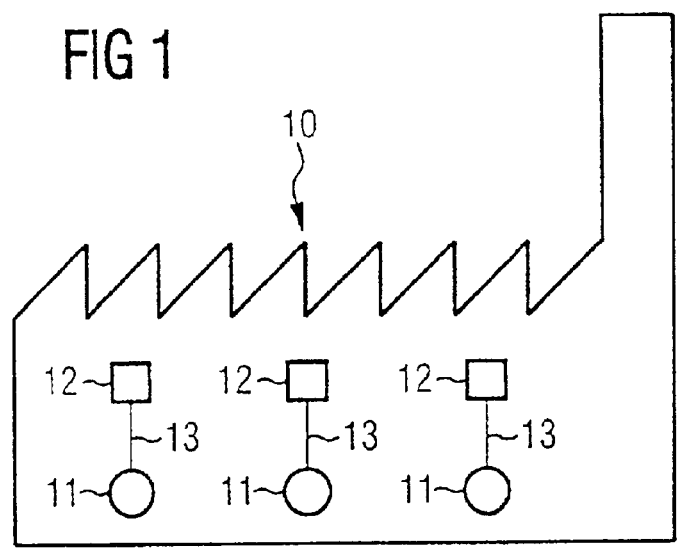
FIG. 1 is a diagrammatic illustration of an installation according to the invention.

Referring now to the figures of the drawing in detail and first, particularly, to FIG. 1 thereof, there is shown an installation 10 which can endanger public safety. The installation 10 has a series of drives 11 which are driven via modules 12. Each of the drives 11 is assigned exactly one module 12.

Figure 2:
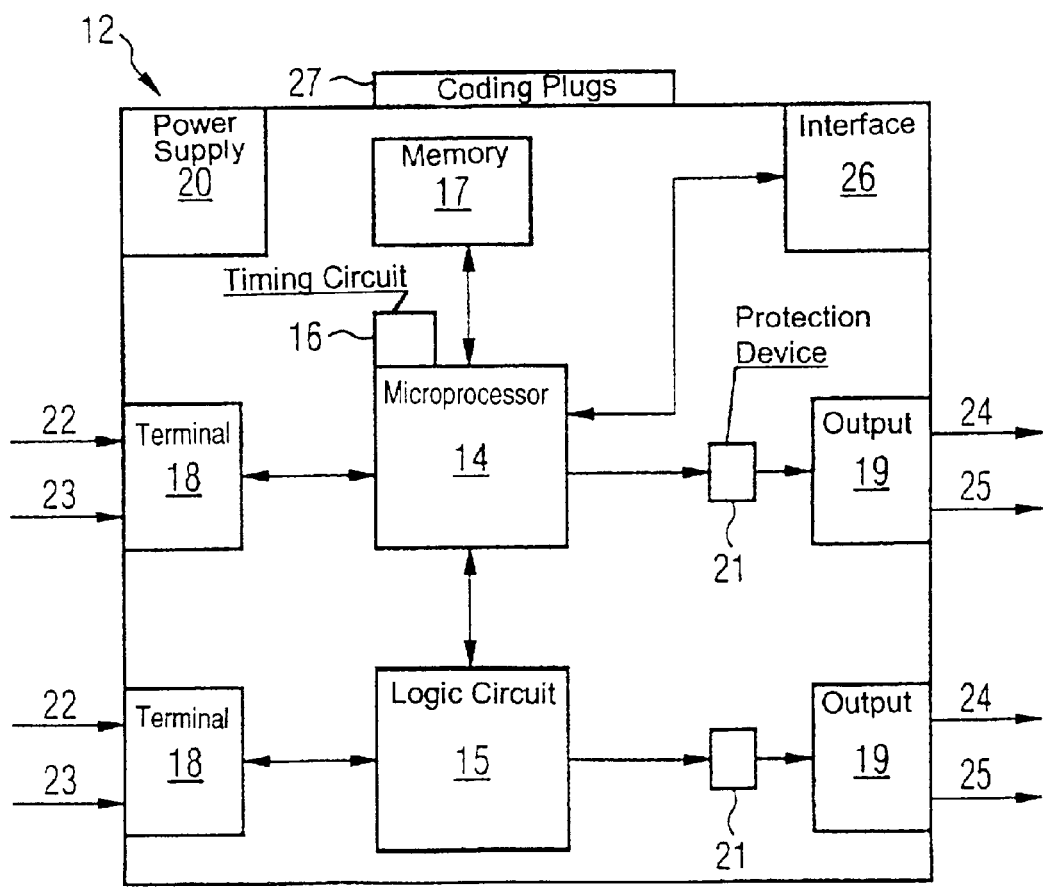
FIG. 2 is a block diagram of a module according to the invention.

FIG. 2 diagrammatically illustrates the construction of the module 12. The module 12 contains a microprocessor 14, a logic circuit 15 and a timing circuit 16. The microprocessor 14 is assigned a memory 17. Furthermore, terminals 18 and outputs 19 are present, which can transmit a plurality of signals, as illustrated by arrows 22 to 25. The microprocessor 14 and the logic circuit 15 are protected against a short circuit of the respective output 19 by an electronic protection device 21. The power required for operating the module 12 is supplied by a power supply 20. The module 12 furthermore has an interface 26 for connection to a diagnostic device or a bus. Coding plugs 27, which enable a movement of the drive 11, are provided on a side that is accessible in the installed state of the module 12.

Figure 3:
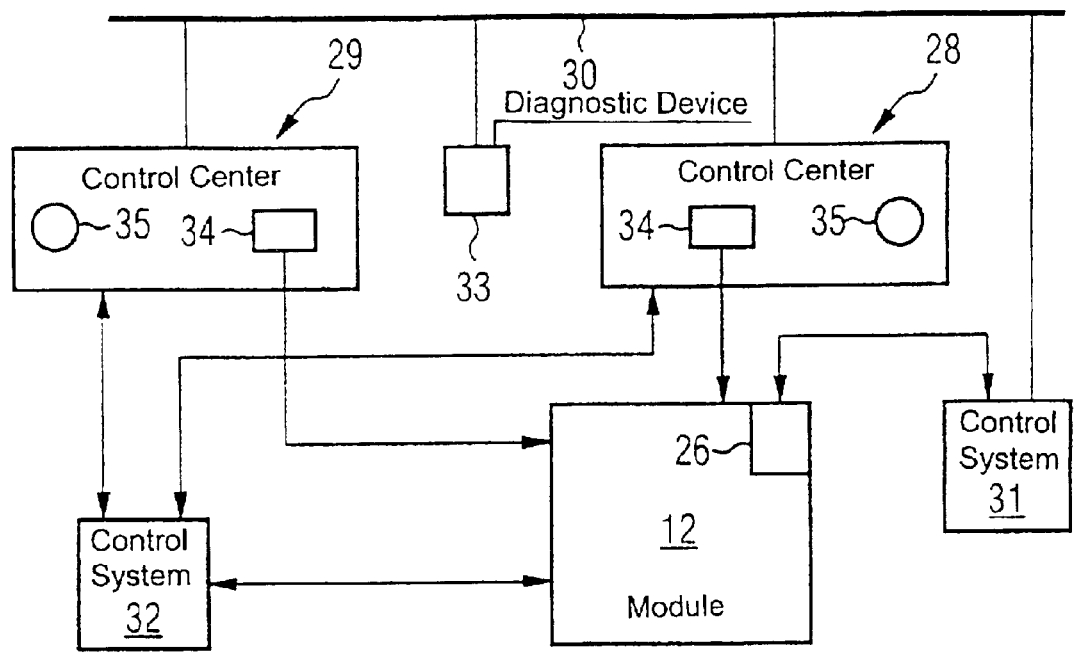
FIG. 3 is a block diagram of a first circuit for using the module according to the invention.
Figure 4:
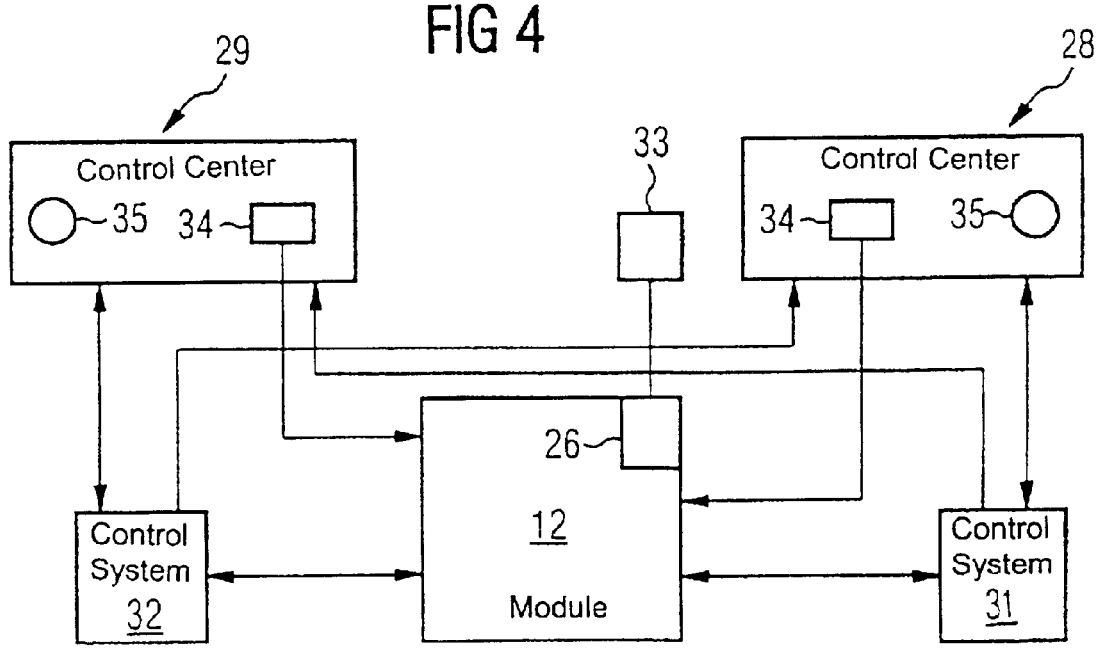
FIG. 4 is a block diagram of a second circuit for using the module according to the invention.

Commands from a control system 31 for operating tasks and a control system 32 for safety tasks are fed to the module 12 in accordance with the arrows 22, 23 (FIGS. 3 and 4). The commands of the control system 32 for safety tasks must be handled with priority. The logic circuit 15 has a fixed-programmed priority function for this purpose.

Depending on the commands received, the module 12 passes output signals to the drive 11 in accordance with the arrows 24, 25. Start-up signals for the drive 11 or a test signal may be involved in this case. The state of the drive 11 is identified by the module 12, for example by an end stop switch or a measurement of the torque.

The commands and also the output signals are stored together with the time of day in the memory 17, so that the operation is logged. For testing purposes, the memory 17 is read periodically or in a manner dependent on the operating behavior.

The terminal 18 and the interface 26 also enable information to be retrieved from the module 12. In particular, the content of the memory 17 or the software used by the microprocessor 14 can be read out. Depending on the respective application, one or both terminals 18 may be omitted and their functions integrated into the interface 26.

FIGS. 3 and 4 show two different connection variants. The variant in accordance with FIG. 3 shows the use of the module 12 in a modern installation with a bus 30, while in FIG. 4 the module 12 has been retrofitted in an old installation with individual cabling.

A main control center 28 and an emergency control center 29 are provided in both variants. The installation is run by the main control center 28 in the normal state. After a failure of the main control center 28, a changeover is made to the emergency control center 29. The main control center 28 and the emergency control center 29 have control console panels 34 for controlling specific operational-critical or safety-critical drives 11 manually. Furthermore, indicators 35 are provided which indicate the state of these or other drives 11.

The control system 31 for operating tasks and the control system 32 for safety tasks are provided in both configurations. As soon as a safety-relevant state is identified, the required measures are proposed by the control system 32 for safety tasks or, depending on the setting, executed immediately.

In FIG. 3, the module 12 is connected to the control system 31 for operating tasks. The control system 31 is connected to the bus 30, which is connected to the main control center 28 and the emergency control center 29. A diagnostic device 33 is clamped onto the bus 30. The control system 32 for safety tasks is independent of the bus 30. It is connected to the module 12, the main control center 28 and the emergency control center 29.

In the configuration in accordance with FIG. 4, the module 12 is not connected to the bus 30, but rather is cabled directly. The same reference symbols as in the previous figures are used for identical or functionally identical components. During normal operation, the module 12 is controlled by the main control center 28 via the control system 31 for operating tasks. If appropriate, the control system 32 for safety tasks intervenes, whose commands are handled with priority by the module 12. Both control systems 31, 32 are connected to the main control center 28 and the emergency control center 29.

In both configurations, the space requirement and the power loss are significantly reduced by the module 12 according to the invention. Furthermore, the module 12 can be used in modern installations 10 with digital control technology, but can also be retrofitted in existing installations 10.

We claim:

1. A module for controlling a drive, the module comprising:
   a terminal for connecting to a control system for operating tasks and a control system for safety tasks, commands from the control system for safety tasks having priority over commands from the control system for operating tasks;
   a microprocessor for processing the commands from both the control system for operating tasks and the control system for safety tasks, said microprocessor coupled to said terminal;
   a logic circuit for prioritizing the commands from the control system for safety tasks, said logic circuit connected to said microprocessor;
   at least one output coupled to at least one of said microprocessor and said logic circuit;
   an interface for connecting to one of the control system for operating tasks and a diagnostic device, said interface connected to said microprocessor; and
   a memory for storing the commands and replies, said memory connected to said microprocessor;
   said microprocessor and said logic circuit connected in parallel with respect to an incoming data stream.

2. The module according to claim 1, wherein said microprocessor has a timing circuit.

3. The module according to claim 1, wherein said logic circuit has a fixed-programmed priority function for the commands from the control system for safety tasks.

4. The module according to claim 1, including at least one electronic protection device protecting against a short circuit of and connected to said output.

5. The module according to claim 1, including coding plugs disposed on a side of the module which is accessible in an installed state.

6. The module according to claim 1, wherein the drive is used in an installation that can endanger public safety.

7. A control device for an installation, comprising:
   two manual control stations being separate from one another;
   a control system for operating tasks;
   a control system for safety tasks; and
   a module connected to each of said two manual control stations, said module including:
   a terminal connected to said control system for operating tasks and said control system for safety tasks, commands from said control system for safety tasks having priority over commands from said control system for operating tasks;
   a microprocessor for processing the commands from both said control system for operating tasks and said control system for safety tasks, said microprocessor coupled to said terminal;
   a logic circuit for prioritizing the commands from said control system for safety tasks, said logic circuit connected to said microprocessor;
   at least one output coupled to at least one of said microprocessor and said logic circuit;
   an interface connected to one of said control system for operating tasks and a diagnostic device, said interface connected to said microprocessor; and
   a memory for storing the commands and replies, said memory connected to said microprocessor;
   said microprocessor and said logic circuit connected in parallel with respect to an incoming data stream.

8. A control method, which comprises:
   providing a control device having two manual control stations being separate from one another, and a module connected to each of the two manual control stations, the module containing:
   a terminal for connecting to a control system for operating tasks and a control system for safety tasks, commands from the control system for safety tasks having priority over commands from the control system for operating tasks;
   a microprocessor for processing the commands from both the control system for operating tasks and the control system for safety tasks, the microprocessor connected to the terminal;
   a logic circuit for prioritizing the commands from the control system for safety tasks, the logic circuit connected to the microprocessor, the logic circuit and the microprocessor connected in parallel with respect to an incoming data stream;
   at least one output coupled to at least one of the microprocessor and the logic circuit;
   an interface for connecting to one of the control system for operating tasks and a diagnostic device, the interface connected to the microprocessor; and
   a memory for storing the commands and replies, the memory connected to the microprocessor; and
   indicating a state of the drive in both of the two manual control stations.

9. The method according to claim 8, which comprises using the diagnostic device for reading out software required for operating the module.

10. The method according to claim 9, which comprises connecting the diagnostic device to a bus connected to the module.

11. The method according to claim 9, which comprises connecting the diagnostic device to the interface of the module.

* * * * *